United States Patent
Wang et al.

(10) Patent No.: US 9,970,441 B2
(45) Date of Patent: May 15, 2018

(54) SCROLL EXPANDER WITH ELECTRICITY GENERATING SCROLLS

(71) Applicant: The University of Warwick, Coventry, Warwickshire (GB)

(72) Inventors: Jihong Wang, Coventry (GB); Xing Luo, Coventry (GB)

(73) Assignee: The University of Warwick, Coventry (GB)

( * ) Notice: Subject to any disclaimer, the term of this patent is extended or adjusted under 35 U.S.C. 154(b) by 59 days.

(21) Appl. No.: 14/778,240

(22) PCT Filed: Apr. 4, 2014

(86) PCT No.: PCT/GB2014/051062
§ 371 (c)(1),
(2) Date: Sep. 18, 2015

(87) PCT Pub. No.: WO2014/162150
PCT Pub. Date: Oct. 9, 2014

(65) Prior Publication Data
US 2016/0290337 A1    Oct. 6, 2016

(30) Foreign Application Priority Data
Apr. 5, 2013 (GB) .................................. 1306165.0

(51) Int. Cl.
*F04C 18/02* (2006.01)
*H02K 7/18* (2006.01)
(Continued)

(52) U.S. Cl.
CPC ........ *F04C 29/0064* (2013.01); *F01C 1/0207* (2013.01); *F04C 18/0207* (2013.01);
(Continued)

(58) Field of Classification Search
CPC ............... F01C 1/0207; F04C 18/0207; F04C 18/0215; F05C 2251/12; H02K 1/34; H02K 7/1892
See application file for complete search history.

(56) References Cited

U.S. PATENT DOCUMENTS 4,456,858 A * 6/1984 Loven .................... H02K 29/10
310/156.38
5,516,267 A * 5/1996 Ikeda .................... F01C 17/066
418/14

(Continued)

FOREIGN PATENT DOCUMENTS

| EP | 0622547 A1 | 11/1994 |
| EP | 2042738 A2 | 4/2009 |
| JP | H06249162 A | 9/1994 |

OTHER PUBLICATIONS

International Search Report issued in International Patent Application No. PCT/GB2014/051062, dated Sep. 12, 2014.
(Continued)

*Primary Examiner* — Tulsidas C Patel
*Assistant Examiner* — S. Mikailoff
(74) *Attorney, Agent, or Firm* — McCarter & English, LLP; David R. Burns

(57) ABSTRACT

A device for generating electrical power, the device comprising a scroll expander with first and second scrolls configured to move relative to each other when a fluid is provided to an inlet at a higher pressure than a pressure at an outlet. The first scroll is configured to provide a magnetic field and the second scroll comprises one or more conductors in which electric currents are induced when the first and second scrolls move relative to each other.

17 Claims, 12 Drawing Sheets

(51) Int. Cl.
 *F04C 29/00* (2006.01)
 *F01C 1/02* (2006.01)
 *H02K 1/34* (2006.01)

(52) U.S. Cl.
 CPC .......... *F04C 18/0215* (2013.01); *H02K 1/34* (2013.01); *H02K 7/1892* (2013.01); *F05C 2251/12* (2013.01)

(56) References Cited

U.S. PATENT DOCUMENTS

| | | | |
|---|---|---|---|
| 9,074,598 B2* | 7/2015 | Shaffer | F25B 1/04 |
| 2002/0039534 A1* | 4/2002 | Moroi | F04C 23/008 |
| | | | 417/372 |
| 2003/0029169 A1 | 2/2003 | Hanna et al. | |
| 2005/0013701 A1* | 1/2005 | Yamanouchi | F01C 1/0215 |
| | | | 417/297 |
| 2005/0188689 A1 | 9/2005 | Juby et al. | |
| 2006/0073050 A1 | 4/2006 | Iwanami et al. | |
| 2009/0180909 A1* | 7/2009 | Schofield | F04C 18/0215 |
| | | | 418/55.1 |
| 2011/0002797 A1 | 1/2011 | Takeuchi et al. | |
| 2011/0176948 A1 | 7/2011 | Shaffer | |
| 2012/0100026 A1* | 4/2012 | Stones | F04C 18/0215 |
| | | | 418/55.1 |
| 2014/0044582 A1* | 2/2014 | Collie | F01C 21/102 |
| | | | 418/55.5 |
| 2016/0273536 A1* | 9/2016 | Deguchi | F01C 21/10 |
| 2016/0344312 A1* | 11/2016 | Trangbaek | H02P 6/006 |

OTHER PUBLICATIONS

Search Report issued in United Kingdom Patent Application No. GB1306165.0, dated Oct. 3, 2013.
Written Opinion issued in issued in International Patent Application No. PCT/GB2014/051062, dated Sep. 12, 2014.
International Preliminary Report on Patentability by the International Bureau of WIPO for International Patent Application PCT/GB2014/051062 dated Oct. 6, 2015.

* cited by examiner

SCROLL EXPANDER WITH ELECTRICITY GENERATING SCROLLS

RELATED APPLICATIONS

This Application is a 35 U.S.C. § 371 National Stage filing of International Application No. PCT/GB2014/051062, filed on Apr. 4, 2014, which claims benefit of and priority to Great Britain Patent Application 1306165.0, filed on Apr. 5, 2013. The contents of each of the above applications are hereby incorporated by reference in their entirety.

FIELD OF THE INVENTION

The present invention relates to a device for generating electrical power.

BACKGROUND

Scroll compressors are widely used as compressors in, for example, air-conditioners and refrigerators. They generally include two interleaved spiral scrolls, one of which is moved in relation to the other in a circular path. This movement causes chambers formed between the interleaved scrolls to move from outer ends of the scrolls to the centre of the device. The chambers decrease in volume, thereby compressing the fluid. Among other things, scroll compressors can be more compact and can operate more quietly than other types of compressors.

A scroll expander, or, in other words, a scroll air motor, corresponds to a scroll compressor operating in reverse. A high-pressure fluid, e.g. compressed air, can be provided to the centre of the device to cause one of the scrolls to move in relation to the other. In this way, the scroll expander generates mechanical work from the expansion and the transmission energy of the fluid.

Scroll expanders can have various applications.

For example, US 2003/0029169 A1 describes a micro combined heat and power system including a scroll expander. The system operates with an organic working fluid that circulates in a Rankine-type cycle. The fluid is superheated by a heat source, expanded through an involute spiral wrap (scroll) expander such that the fluid remains superheated through the expander, cooled in a condenser, and pressurized by a pump. Heat exchange loops within the system provide hot water production capability, while a generator is coupled to the scroll expander to generate electrical power.

US 2005/0188689 A1 describes a system for generating back-up electrical power. The system includes a vessel adapted to contain a volume of compressed gas and a valve to release gas from the vessel at a predetermined pressure. A scroll expander is adapted to receive and pass the released gas. An electrical generator is drivingly connected to a rotatable member of the expander to generate a supply of electrical power.

SUMMARY

According to a first aspect of the present invention, there is provided a device for generating electrical power, the device including a scroll expander with first and second scrolls configured to move relative to each other when a fluid is provided to an inlet at a higher pressure than a pressure at an outlet. The first scroll is configured to provide a magnetic field and the second scroll includes one or more conductors in which electric currents are induced when the first and second scrolls move relative to each other.

Thus, the device can be used to directly generate electrical power, that is to say without needing to be coupled to a separate generator.

In some of the example embodiments described below, the first scroll is a moving scroll and the second scroll is a fixed scroll.

The device may include one or more magnetic regions extending around and/or spaced around the first scroll. At least one of the one or more magnetic regions may be unidirectionally magnetised. The at least one magnetic region may be unidirectionally magnetised (that is to say magnetised in a single direction) in a direction substantially parallel to a radial line from the centre of the first scroll through a centre of the magnetic region.

Each of the one or more magnetic regions may include a magnetised hard ferromagnetic material.

The device may include one or more electrical outputs electrically connected to the one or more conductors.

The device may include a plurality of the conductors spaced around the second scroll.

The device may include a plurality of magnetic regions and a plurality of the conductors. One or more of the plurality of conductors may be arranged in association with a corresponding one or more of the plurality of the magnetic regions.

At least one of the one or more conductors may include a coil. The coil axis may be substantially aligned with a radial line from the centre of the first scroll.

At least one of the one or more conductors may include one or more conducting members connecting two conducting plates. The conducting members may extend in a direction substantially perpendicular to a radial line from the centre of the first scroll.

Thus, the characteristics of the magnetic field, of the one or more conductors, and of the interactions therebetween can be controlled so as to control the electrical output, for example to maximise the electrical power.

The device may include at least one magnetic region included inside the first scroll and/or at least one of the one or more conductors may be included inside the second scroll. A plate associated with the second scroll may include one or more passages to the inside of the second scroll to allow electrical connections to be made to the at least one conductor.

Thus, magnetic regions, conductors and/or electrical connections can be included without adversely affecting the original efficiency with which the device handles the fluid and moves.

The device may include circuitry electrically connected to the one or more conductors and configured to convert the induced currents to provide an electrical output with predetermined characteristics. The circuitry may include at least one rectifier, each rectifier connected to one of the conductors or to two or more of the conductors which are electrically connected to one another.

Thus, an electrical output can be provided in a form that is suitable for a particular external circuit.

The second scroll may be further configured to provide a further magnetic field. The first scroll may further include one or more further conductors in which electric currents are induced when the first and second scrolls move relative to each other.

There may be provided a system including the device. The system may be a micro combined heat and power system, a compressed air energy storage system, a back-up power system, a standby power system, or an Uninterruptible Power Supply (UPS) system.

The device may include a scroll compressor instead of a scroll expander. The scroll compressor may comprise first and second scrolls configured to move relative to each other to pump, compress or pressurize a fluid in response to a driving force applied to the first and/or the second scroll. The first scroll may be configured to provide a magnetic field and the second scroll may include one or more conductors in which electric currents are induced when the first and second scrolls move relative to each other.

BRIEF DESCRIPTION OF THE DRAWINGS

Certain embodiments of the invention will now be described, by way of example, with reference to the accompanying drawings, in which:

FIG. 1b illustrates a cross-sectional view of the scroll expander of FIG. 1a, wherein the view is defined in FIG. 1a;

FIG. 2b illustrates a cutaway view of the moving part of FIG. 2a, wherein the view is defined in FIG. 2a;

FIG. 3b illustrates a cutaway view of the moving part of FIG. 3a, wherein the view is defined in FIG. 3a;

FIG. 5b illustrates a cutaway view of the fixed part of FIG. 5a, wherein the view is defined in FIG. 5a;

DETAILED DESCRIPTION OF THE CERTAIN EMBODIMENTS

Figure 1A:
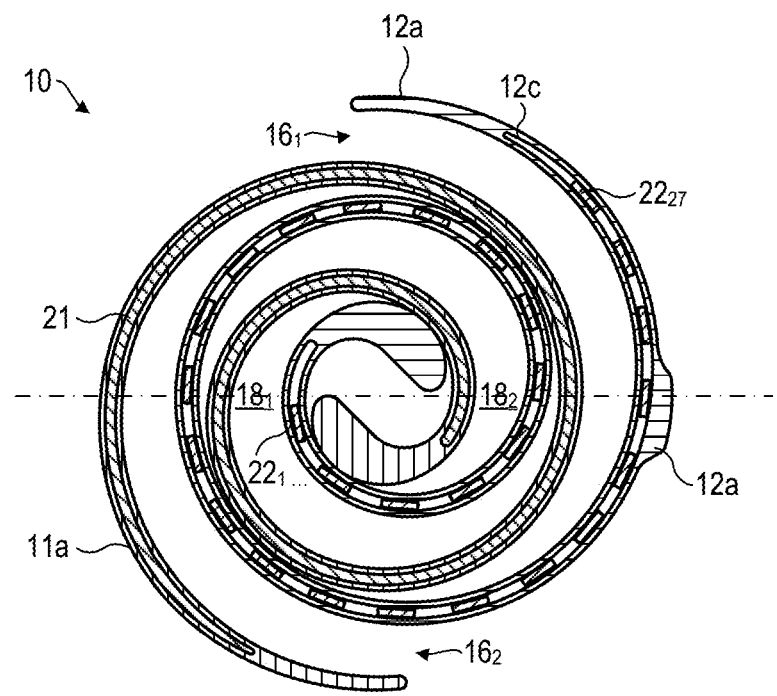
FIG. 1a illustrates a cross-sectional view of a scroll expander forming part of a device for generating electrical power, wherein the view is defined in FIG. 1b.
Figure 1B:
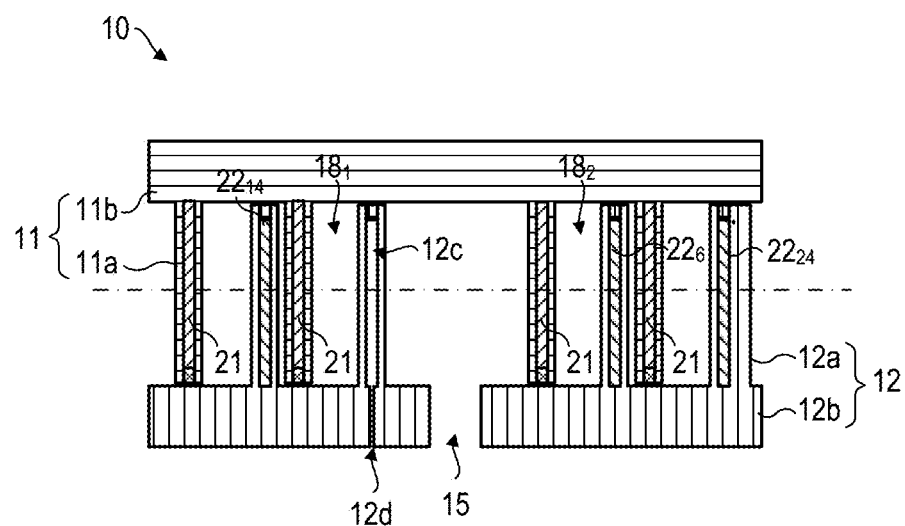

Referring to FIGS. 1a and 1b, a scroll expander 10 is shown. The scroll expander 10 constitutes or is included in a device 1 (FIG. 9) for generating electrical power.

The scroll expander 10 includes a moving part 11 and a fixed part 12. The moving part 11 includes a scroll 11a (hereinafter referred to as the "moving scroll") and a plate 11b (hereinafter referred to as the "moving plate"). The fixed part 12 includes a scroll 12a (hereinafter referred to as the "fixed scroll") and a plate 12b (hereinafter referred to as the "fixed plate").

Each of the two scrolls 11a, 12a is in the form of a spiral. The two scrolls 11a, 12a are interleaved. Seals are formed between the moving scroll 11a and the fixed plate 12b and between the fixed scroll 12a and the moving plate 11b. Further elements such as tip seals (not shown) are included to form these seals. Seals are also formed between the moving scroll 11a and the fixed scroll 12a. Hence crescent-shaped chambers $18_1$, $18_2$ are formed between the two scrolls 11a, 12a.

The scroll expander 10 includes a central inlet 15 for a fluid, normally compressed air, provided from a source (not shown). The scroll expander 10 includes outlet regions $16_1$, $16_2$ (hereinafter referred to simply as the "outlet") for the fluid at the outer end of each of the scrolls 11a, 12a. The scroll expander 10 includes an outer body shell (not shown) which may have a single outlet.

When the fluid is provided to the inlet 15 at a higher pressure than the pressure at the outlet $16_1$, $16_2$, the moving part 11 is caused to move in relation to the fixed part 12 along an orbit. The scroll expander 10 carries the fluid from the inside to the outside of the two scrolls 11a, 12a. The fluid is carried in the chambers $18_1$, $18_2$. The chambers $18_1$, $18_2$ increase in volume towards the outside of the two scrolls 11a, 12a and so the fluid is expanded. The expansion energy of the fluid as well as the transmission energy of the fluid drives the movement of the moving part 11. The fluid may include a gas, such as compressed air, or a liquid, such as an organic refrigerant. The fluid may be below, at, or above room temperature.

Figure 9:
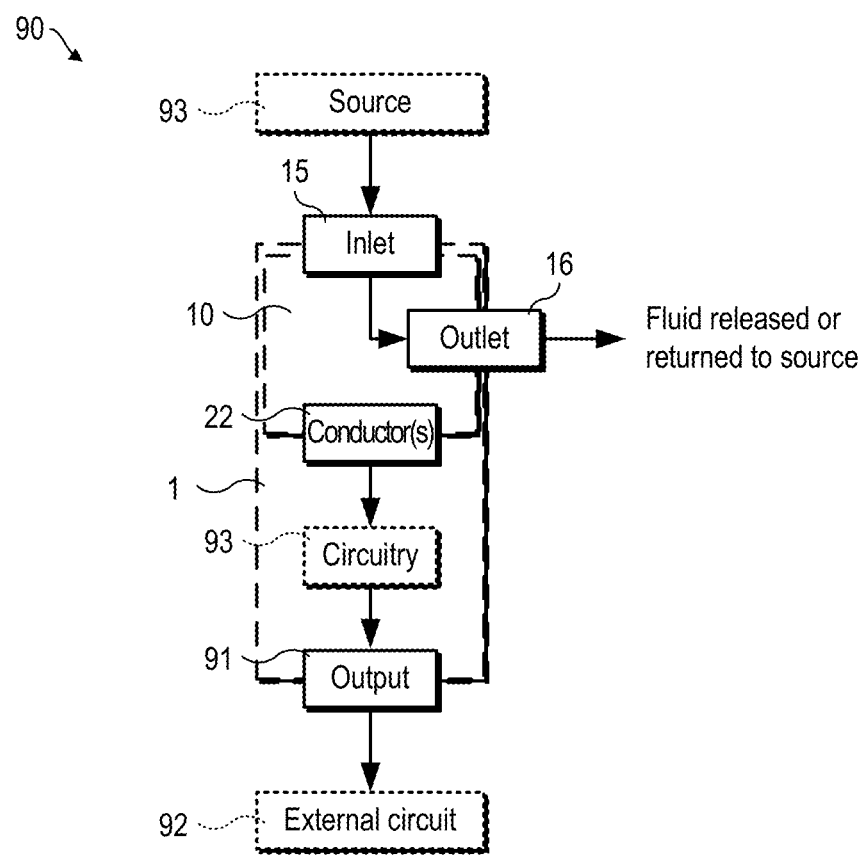
FIG. 9 is a block diagram of a system including the device for generating electrical power.

As will be explained in more detail below, the moving scroll 11a includes a magnetic region 21 to provide a magnetic field. The fixed scroll 12a includes one or more coils 22 in which electric currents are induced when the scrolls 11a, 12a move in relation to each other. The scroll expander 10 includes one or more outputs 91 (FIG. 9) attached to the coils 22 via which the induced currents can be provided to an external circuit 92 (FIG. 9).

The scroll expander 10 generally includes several further parts which are not shown in the figures for reasons of clarity. These further parts will be known per se to the person skilled in the art. The scroll expander 10 may include a bearing to transmit the orbital movement of the moving part 11 to the rotation of a shaft, as well as a mechanism for urging the moving part 11 and the fixed part 12 together.

Figure 2A:
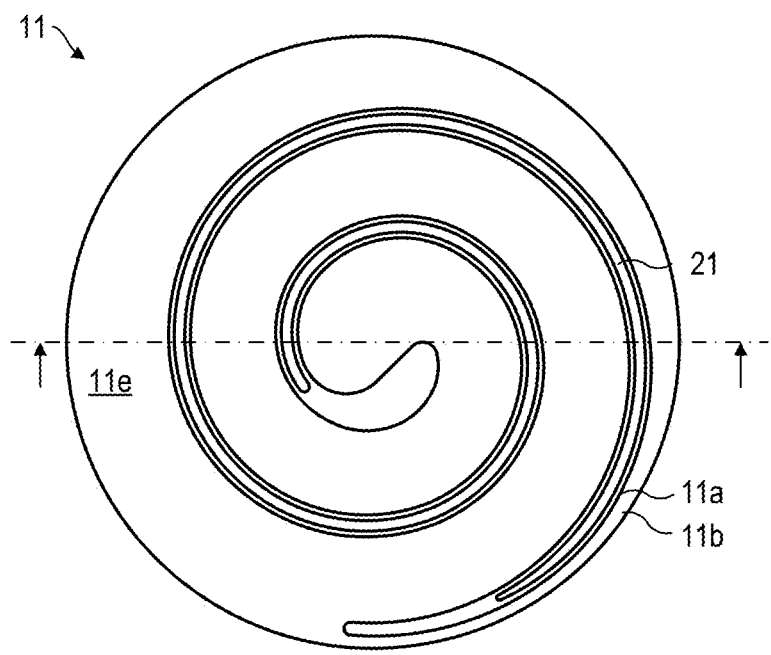
FIG. 2a illustrates a cutaway view of the moving part of the scroll expander of FIGS. 1a and 1b, wherein the view is defined in FIG. 2b, wherein the moving part has a single magnetic region.
Figure 2B:
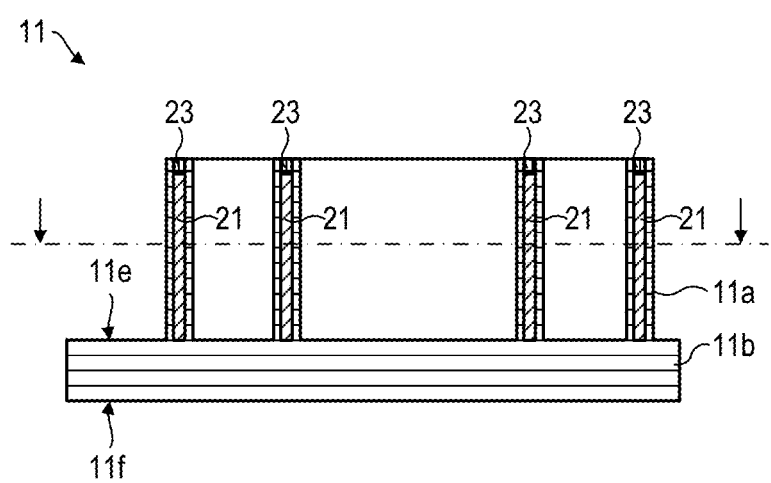

Referring to FIGS. 2a and 2b, the moving part 11 of the scroll expander 10 will now be described in more detail.

The moving plate 11b includes a flat, major surface 11e (hereinafter referred to as the "upper surface", the opposite surface 11f hereinafter referred to as a "lower surface") which defines a first plane. The moving scroll 11a extends from the upper surface 11e of the moving plate 11b in a direction perpendicular to this first plane.

In this example, the moving plate 11b is cylindrical. However, the moving plate 11b may be a different shape. The moving plate 11b may include additional elements (not shown), for example elements on its lower surface 11f for connecting to the bearing and urging mechanism described above.

The major axis of the moving scroll 11a extends in a spiral in a plane parallel to the first plane defined by the upper surface 11e of the moving plate 11b. In this example, the spiral is an involute of a circle. The spiral has approximately two-and-a-quarter turns. However, the spiral may be a different shape and/or may have fewer or more turns. The moving scroll 11a has a rectangular cross section. The major axis of the rectangular cross section is perpendicular to the first plane. The length of the major axis of the rectangular cross section (hereinafter referred to as the "height") is constant throughout. The length of the minor axis of the rectangular cross section (hereinafter referred to as the "width") is also constant apart from regions towards the ends of the spiral. In other examples, the moving scroll 11a may be a different height, width and/or shape.

The moving part 11 may be formed, for example, from a metallic material, a plastic material and/or a ceramic material. The moving part 11 may be formed, for example, by moulding and/or machining of the material.

The moving scroll 11a includes a magnetic region 21 to provide a magnetic field.

The magnetic region 21 includes a magnetised 'hard' ferromagnetic material (hereinafter referred to simply as a "magnetic material"). The magnetic material may be a rare-earth magnetic material, such as neodymium-iron-boron or samarium-cobalt.

In this example, the moving scroll 11a includes a single magnetic region 21 and a single piece of magnetic material. The magnetic region 21 may have the same magnetisation direction throughout.

The magnetic region 21 is included inside the moving scroll 11a. The major axis of the magnetic region 21 extends along a part of the spiral defined by the axis of the moving scroll 11a. The magnetic region 21 extends around approximately one-and-three-quarter turns, leaving regions at either end of the moving scroll 11a without magnetic material. The magnetic region 21 is arranged centrally in the cross section of the moving scroll 11a. The magnetic region 21 has a rectangular cross section. The major axis of the rectangular cross section is perpendicular to the first plane defined by the upper surface 11e of the moving plate 11b. The length of the major axis (hereinafter referred to as the "height") and the length of the minor axis (hereinafter referred to as the "width") of the rectangular cross section are generally constant throughout. The height of the magnetic region 21 is less than that of the moving scroll 11a. A washer 23 is provided on the surface of the magnetic region 21 furthest from the moving plate 11b (hereinafter referred to as the "upper surface"). The washer 23 covers the magnetic region 21 and is adapted to seal and/or protect it. The washer 23 may be formed, for example, from a metallic material, a plastic material and/or a ceramic material. The width of the magnetic region 21 is less than that of the moving scroll 11a. In other examples, the magnetic region 21 may be a different height, width and/or shape, and/or may be arranged differently in the moving scroll 11a. The washer 23 need not be included.

The magnetic material may, for example, be pre-formed, e.g. by sintering or bonding, or may be included in the form of a powder. The magnetic material may, for example, be pre-magnetised or magnetised in situ.

The moving scroll 11a may be provided with a void into which the magnetic material is introduced. The moving scroll 11a may be formed around the magnetic region 21.

Figure 3A:
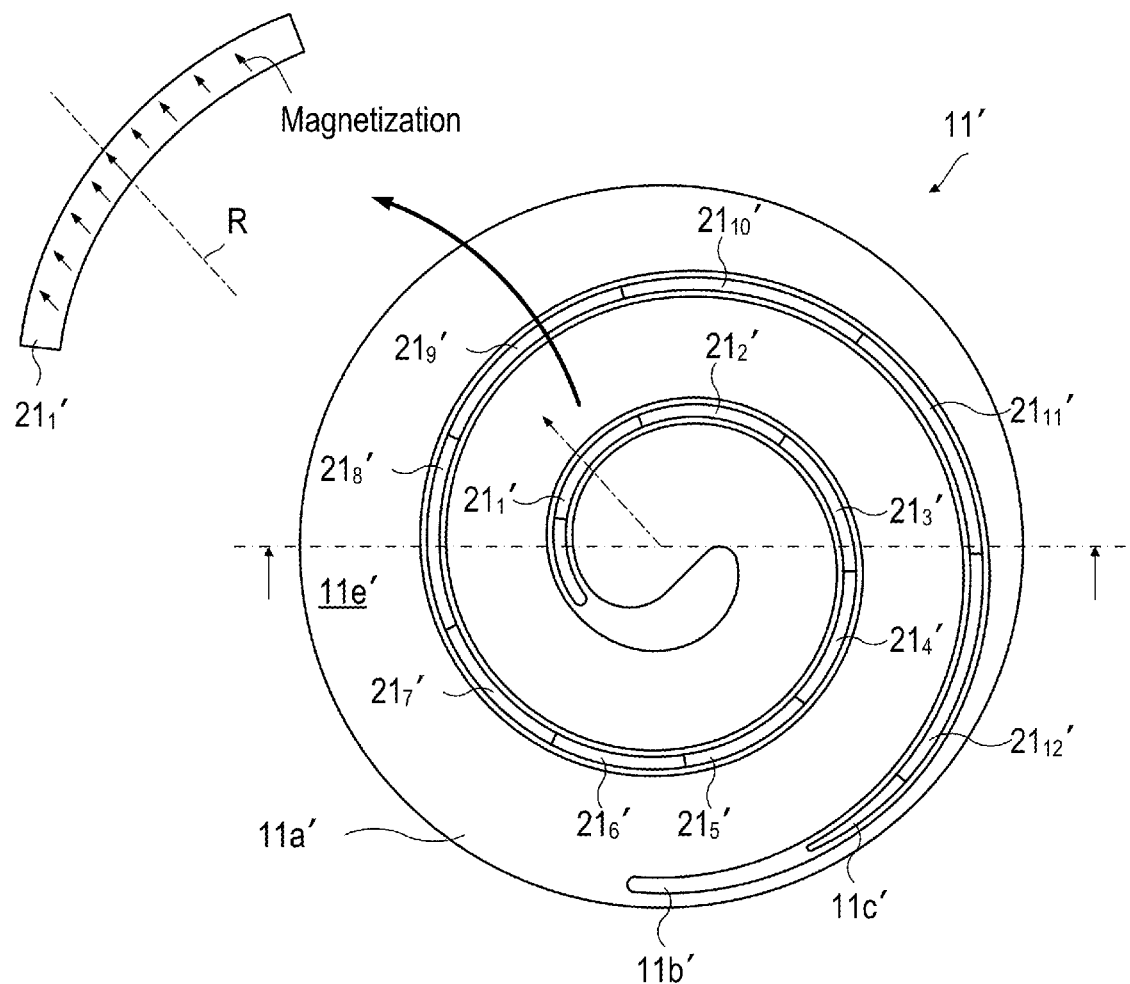
FIG. 3a illustrates a cutaway view of an alternative moving part of a scroll expander, wherein the view is defined in FIG. 2b, wherein the alternative moving part has multiple magnetic regions.
Figure 3B:
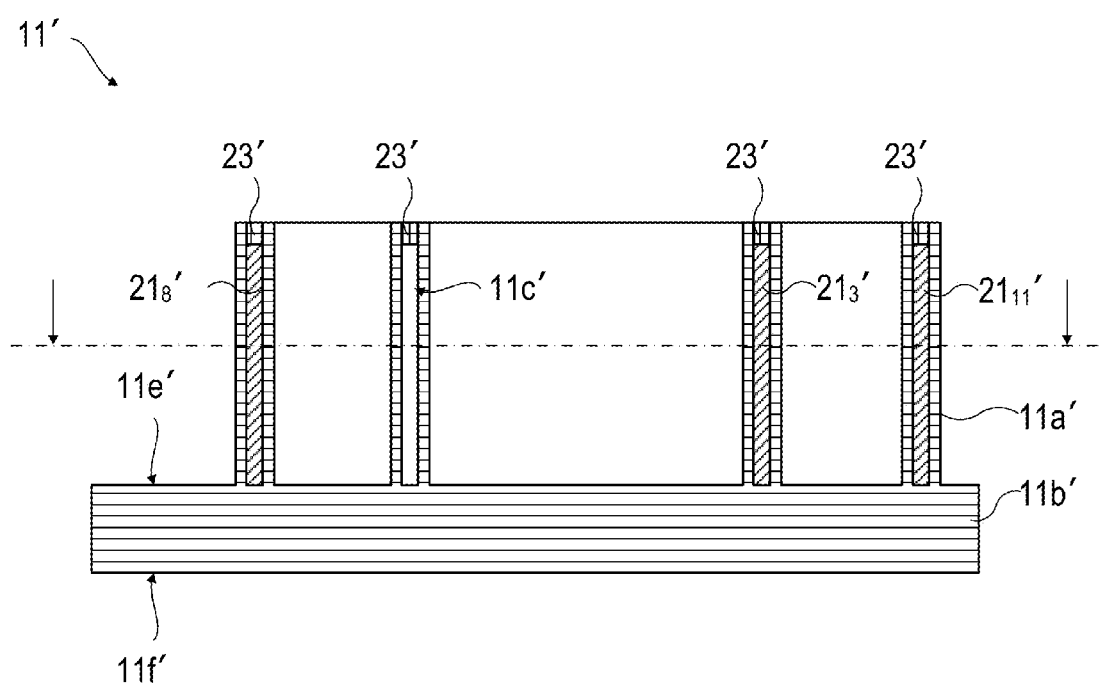

Referring to FIGS. 3a and 3b, an alternative moving part 11' is shown. The scroll expander 10 may include the alternative moving part 11' rather than the moving part 11 described above.

The alternative moving part 11' includes several magnetic regions 21'. In this example, it includes twelve magnetic regions $21_1'$, $21_2'$, $21_3'$, $21_4'$, $21_5'$, $21_6'$, $21_7'$, $21_8'$, $21_9'$, $21_{10}'$, $21_{11}'$, $21_{12}'$. However, there may be fewer or more magnetic regions 21', e.g. six or eighteen magnetic regions 21'. The magnetic regions 21' are included inside the moving scroll 11a'. The magnetic regions 21' each extend along a part of the spiral defined by the axis of the moving scroll 11a' and have a rectangular cross section similar to that described above in relation to the magnetic region 21 in the moving part 11. In other examples, some or all of the magnetic regions 21' may be a different shape, e.g. rectangular. The magnetic regions 21' are arranged along a part of the spiral defined by the axis of the moving scroll 11a, without any gaps between the magnetic regions 21'. In other examples, the magnetic regions 21' may be arranged differently, e.g. with gaps therebetween.

The moving scroll 11a' of the alternative moving part 11' has a void 11c' inside which the magnetic regions $21_1$ are included. The void 11c' is open at the surface of the moving scroll 11a furthest from the moving plate 11b. The void 11c' has a cross section such that the moving scroll 11a includes walls with uniform thicknesses on either side of the void 11c'. A washer 23' covers the magnetic regions 21' and occupies a region of the void 11c' furthest from the moving plate 11b'. In other examples, the void 11c' may be arranged and/or shaped differently. The moving scroll 11a' may have more than one void 12c. The washer 23' need not be included.

The magnetic regions 21' may each include a single piece of pre-magnetised magnetic material. For example, they may each have a magnetisation direction which is substantially parallel to a radial line from the centre of the moving scroll 11a' through the centre of the magnetic region 21'. The magnetisation may be directed radially inwards or outwards or may alternate between neighbouring pieces of magnetic material.

Figure 4:
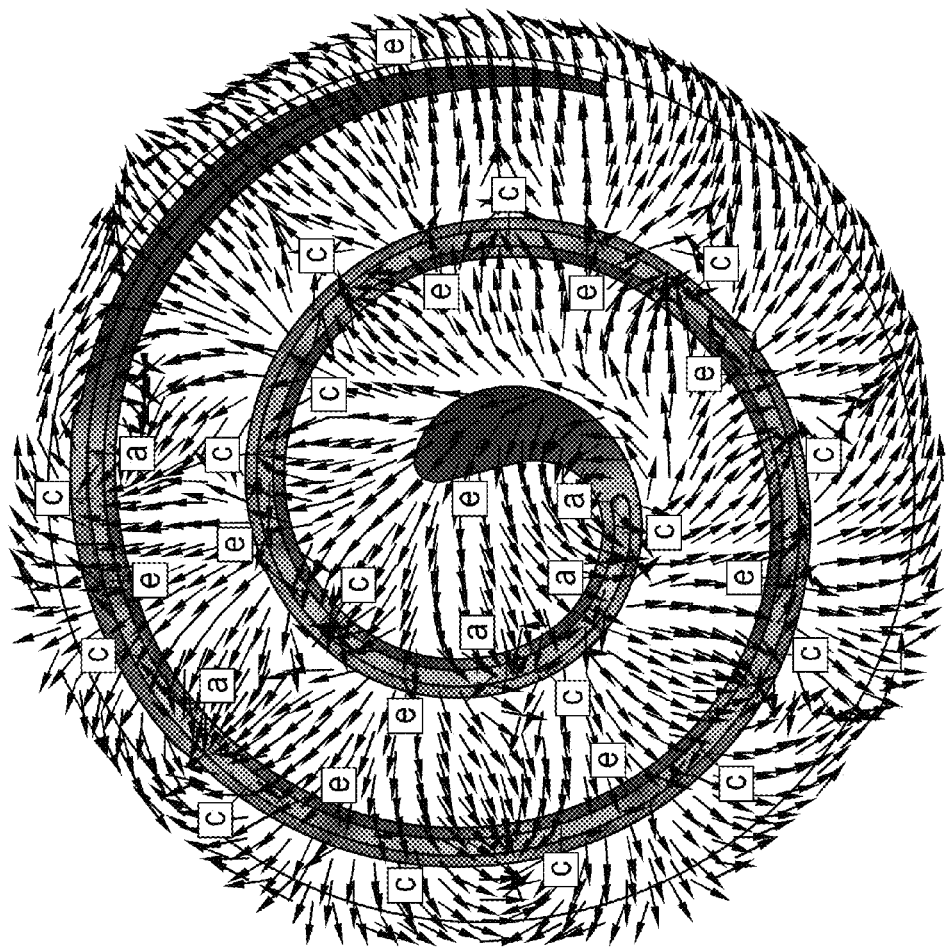
FIG. 4 illustrates magnetic fields provided by the moving part of FIGS. 3a and 3b.

Referring to FIG. 4, the magnetic field in and around the alternative moving part 11' is shown. In this case, the magnetisation of the magnetic regions 21' is directed radially outwards as described above. The arrows in the figure indicate the direction and distribution of the magnetic field and the shading indicates the magnitude of the magnetic flux density in the alternative moving part 11'. The labels 'a', 'b', 'c', 'd', and 'e' are used to identify certain levels of shading.

Figure 5A:
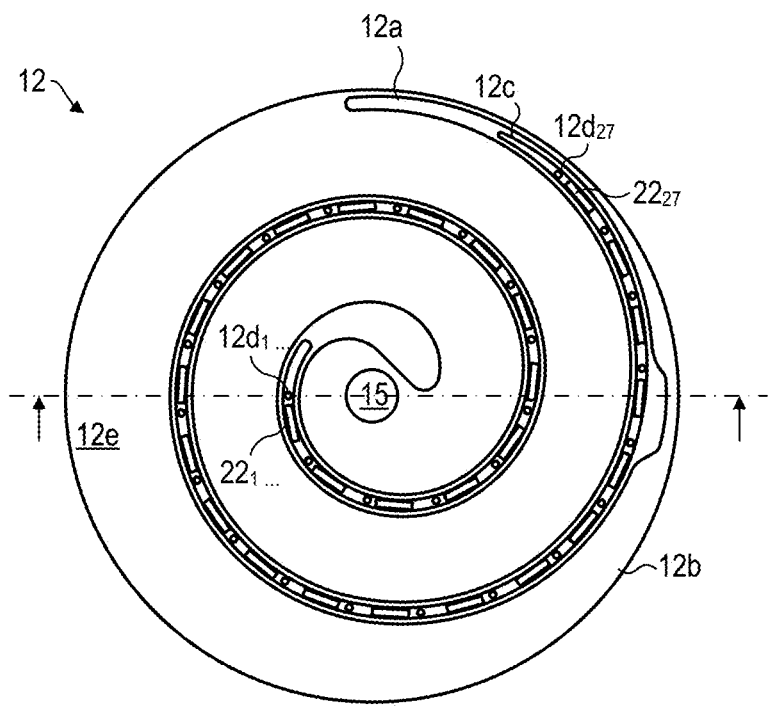
FIG. 5a illustrates a cutaway view of the fixed part of the scroll expander of FIGS. 1a and 1b, wherein the view is defined in FIG. 5b.
Figure 5B:
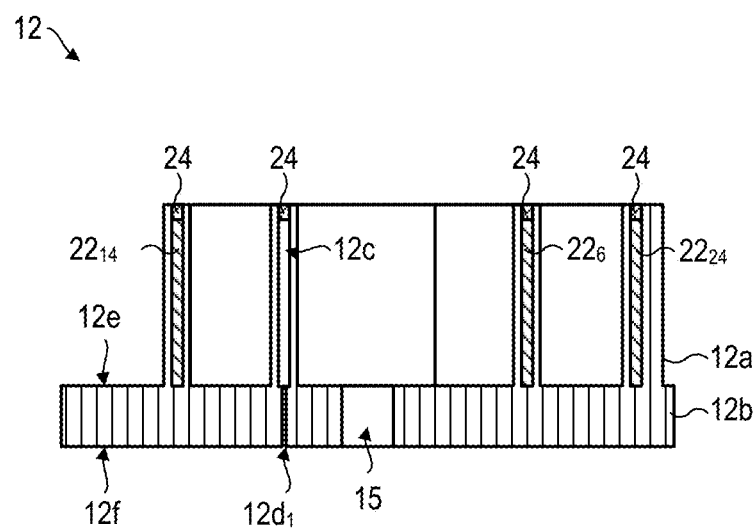

Referring to FIGS. 5a and 5b, the fixed part 12 of the scroll expander 10 will now be described in more detail.

The fixed part 12 generally corresponds to a mirror image of the moving part 11.

The fixed plate 12b includes a flat, major surface 12e (hereinafter referred to as the "upper surface", the opposite surface 12f hereinafter referred to as the "lower surface") which defines a second plane. The fixed scroll 12a extends from the upper surface 12e of the fixed plate 12b in a direction perpendicular to the second plane.

The fixed plate 12b has a fluid passage therethrough between the upper and lower surfaces 12e, 12f which defines the inlet 15. As will be explained in more detail below, the inlet 15 is adapted to receive high-pressure fluid (normally compressed air) from a source 93 (FIG. 9). The inlet 15 is at or near the centre of the fixed part 12. In particular, the inlet 15 may be positioned within the region defining the involute spiral of the fixed scroll 12a.

In this example, the fixed plate 12b is cylindrical. However, the fixed plate 12b may be a different shape. The fixed plate 12b may include additional elements (not shown), for example elements on its lower surface 12f for mounting the fixed part 12b in the scroll expander 10 and for facilitating connections to the inlet 15.

The major axis of the fixed scroll 12a extends in a spiral in a plane parallel to the second plane defined by the upper surface 12e of the fixed plate 12b. The spiral is a mirror image of that in the moving scroll 11a. The fixed scroll 12a has a rectangular cross section. The major axis of the rectangular cross section is perpendicular to the first plane. The length of the major axis of the rectangular cross section (hereinafter referred to as the "height") is constant throughout. The length of the minor axis of the rectangular cross section (hereinafter referred to as the "width") is also constant apart from regions towards the ends of the spiral. In other examples, the fixed scroll 12a may be a different shape. In any case, the moving scroll 11a and the fixed scroll 12a are adapted to cooperate to carry the fluid as described above.

Like the moving part 11, the fixed part 12 may be formed, for example, from a metallic material, a plastic material and/or a ceramic material. The fixed part 12 may be formed, for example, by moulding and/or machining of the material.

The fixed scroll 12a includes one or more conducting coils 22 in which electric currents are induced when the moving scroll 11a moves relative to the fixed scroll 12a.

In this example, the fixed scroll 12a includes twenty-seven coils $22_1, \ldots 22_{27}$. However, there may be fewer or more coils 22. The coils 22 are included inside the fixed scroll 12a. The coils 22 are evenly distributed along a part of the spiral defined by the axis of the fixed scroll 12a. The coils 22 are distributed along approximately one-and-three-quarter turns, leaving regions at either end of the fixed scroll 12a without coils 22. In other examples, the coils 22 may be arranged differently, for example, they may be distributed unevenly around the fixed scroll 12a.

The fixed scroll 12a has a void 12c in which the coils 22 are included. The void 12c is open at the surface of the fixed scroll 12a furthest from the fixed plate 12b (hereinafter referred to as the "top" surface). The void 12c has a cross section such that the fixed scroll 12a includes walls with uniform thicknesses on either side of the void 12c. A washer 24 covers the coils 22 and occupies a region of the void 12c furthest from the fixed plate 12b. In other examples, the void 12c may be arranged and/or shaped differently. The fixed scroll 12a may have more than one void 12c. The washer 24 need not be included.

The fixed plate 12b has wire passages $12d_1, \ldots, 12d_{27}$ therethrough to allow electrical connections to be made to the coils 22. In this example, there is one passage 12d for each coil 22. However, there may be more than one passage 12d for each coil 22. For example, there may be two passages 12d to allow electrical connections to be made to each end of each coil 22. There may be fewer than one passage 12d for each coil 22. For example, sets of two or more coils 22 may be electrically connected to each other inside the void 12c and there may be a passage 12d to allow electrical connections to be made to each of the sets of coils 22.

The passages 12d connect the void 12c in the fixed plate to the lower surface 12f of the fixed plate 12b. In this way, the electrical connections can be made without adversely affecting the seals between the various parts of the scroll expander 10 and hence the formation of the chambers $18_1$, $18_2$.

Figures 6, 7:
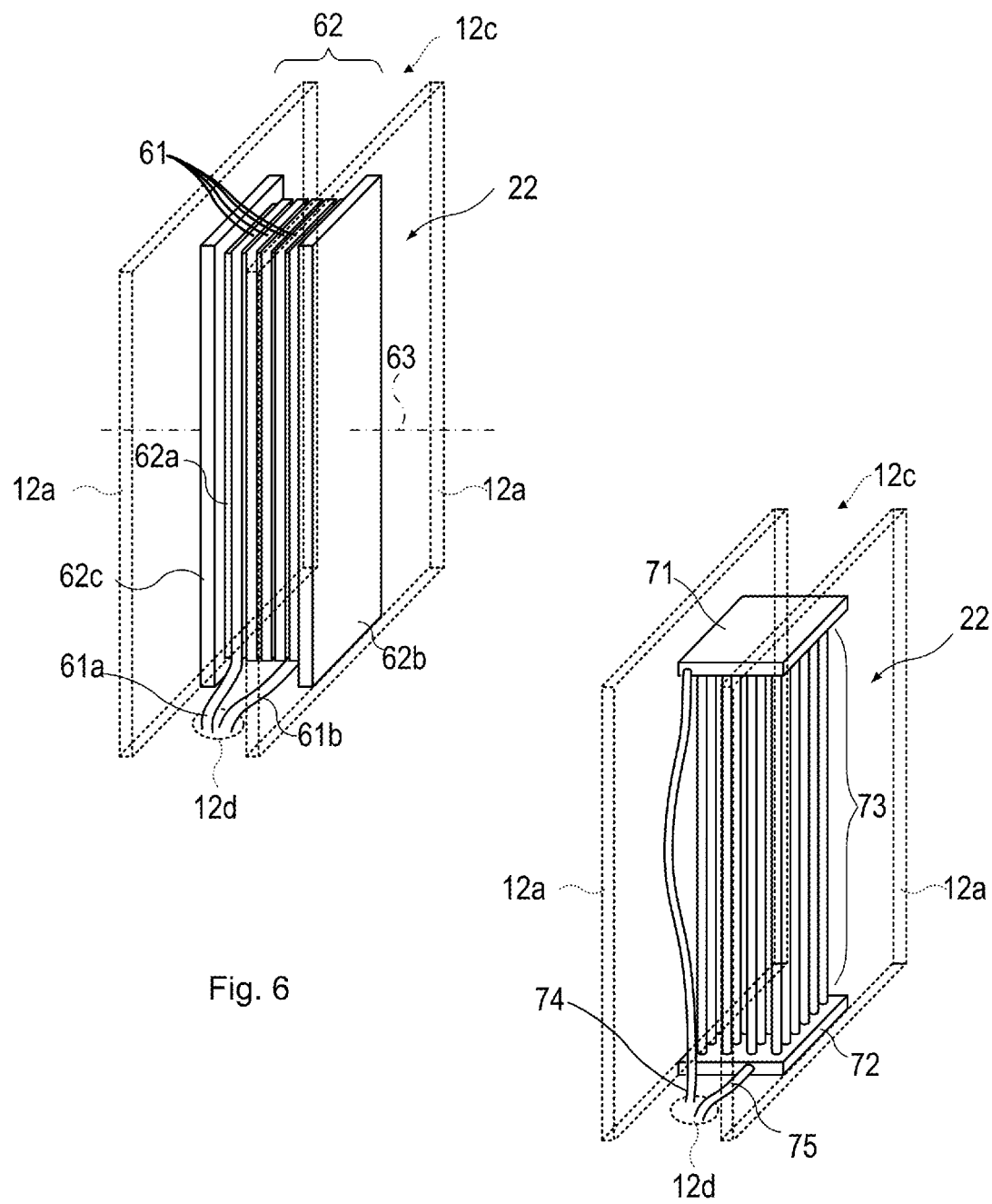
FIG. 6 illustrates a perspective view of a coil which can be included in the fixed part of FIGS. 5a and 5b.
FIG. 7 illustrates a perspective view of an alternative coil which can be included in the fixed part of FIGS. 5a and 5b.
Figure 8A:
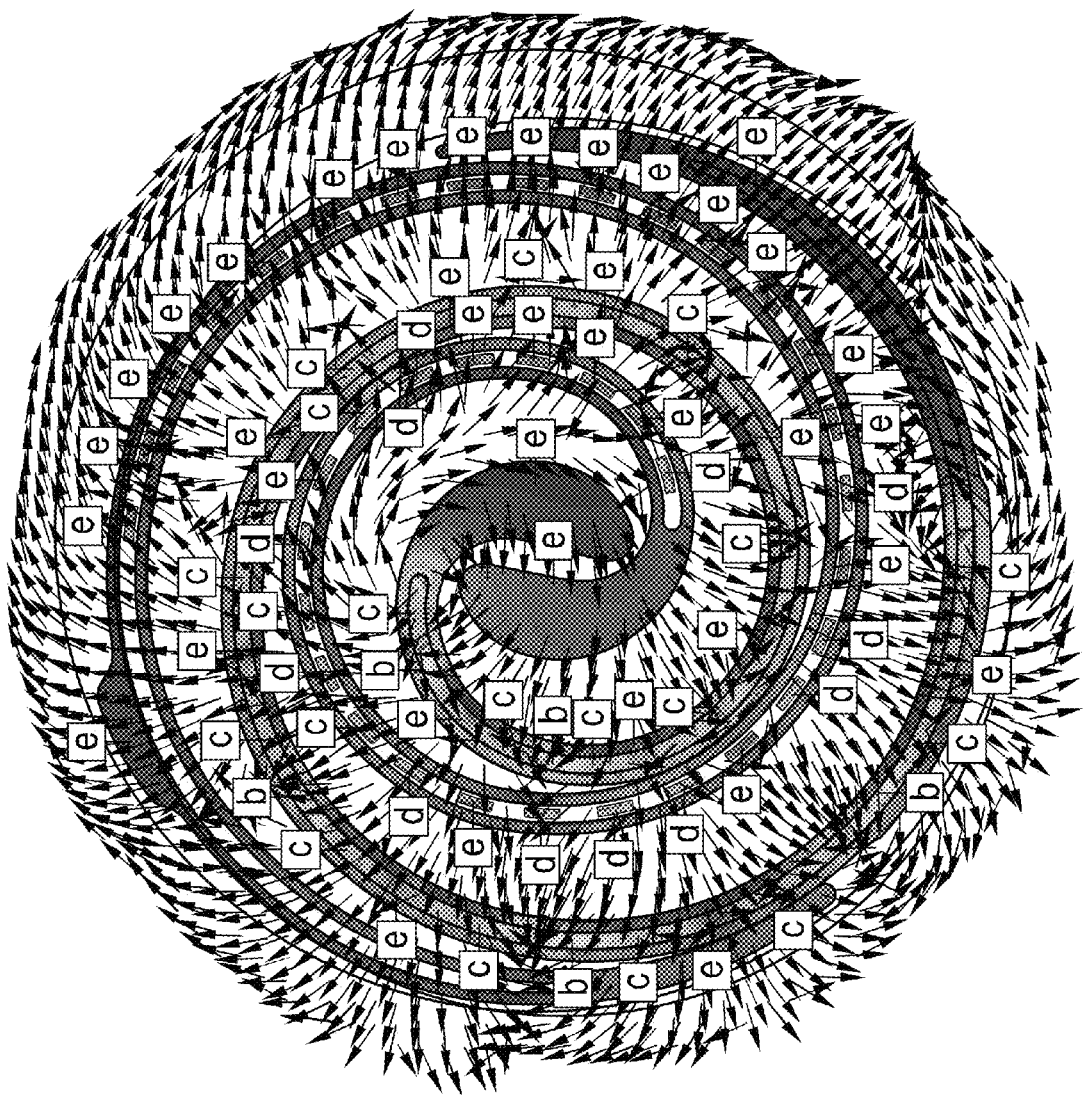
FIGS. 8a, 8b, 8c and 8d illustrate the magnetic fields in the scroll expander of FIGS. 1a and 1b in first, second, third and fourth positions respectively.
Figure 8B:
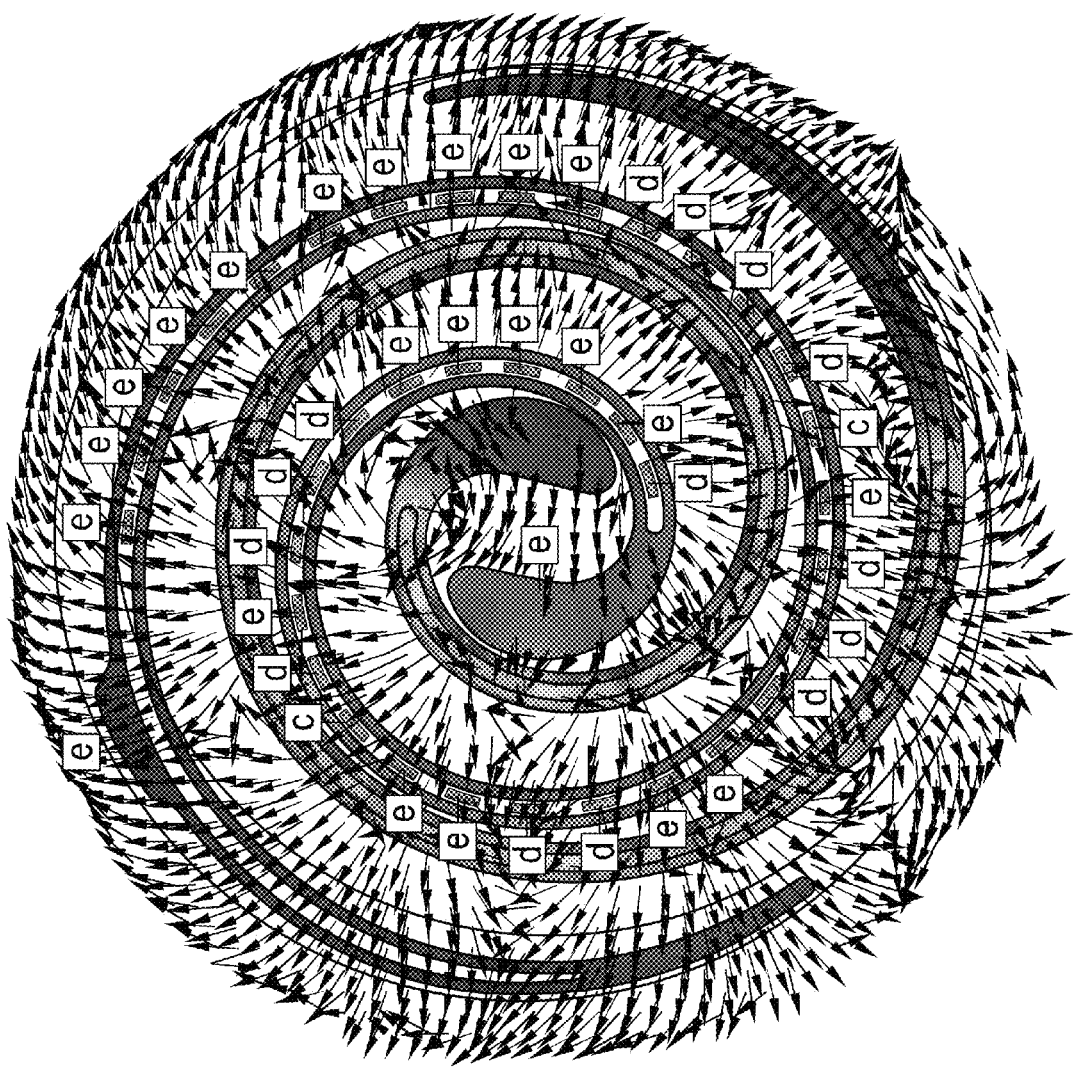
Figure 8C:
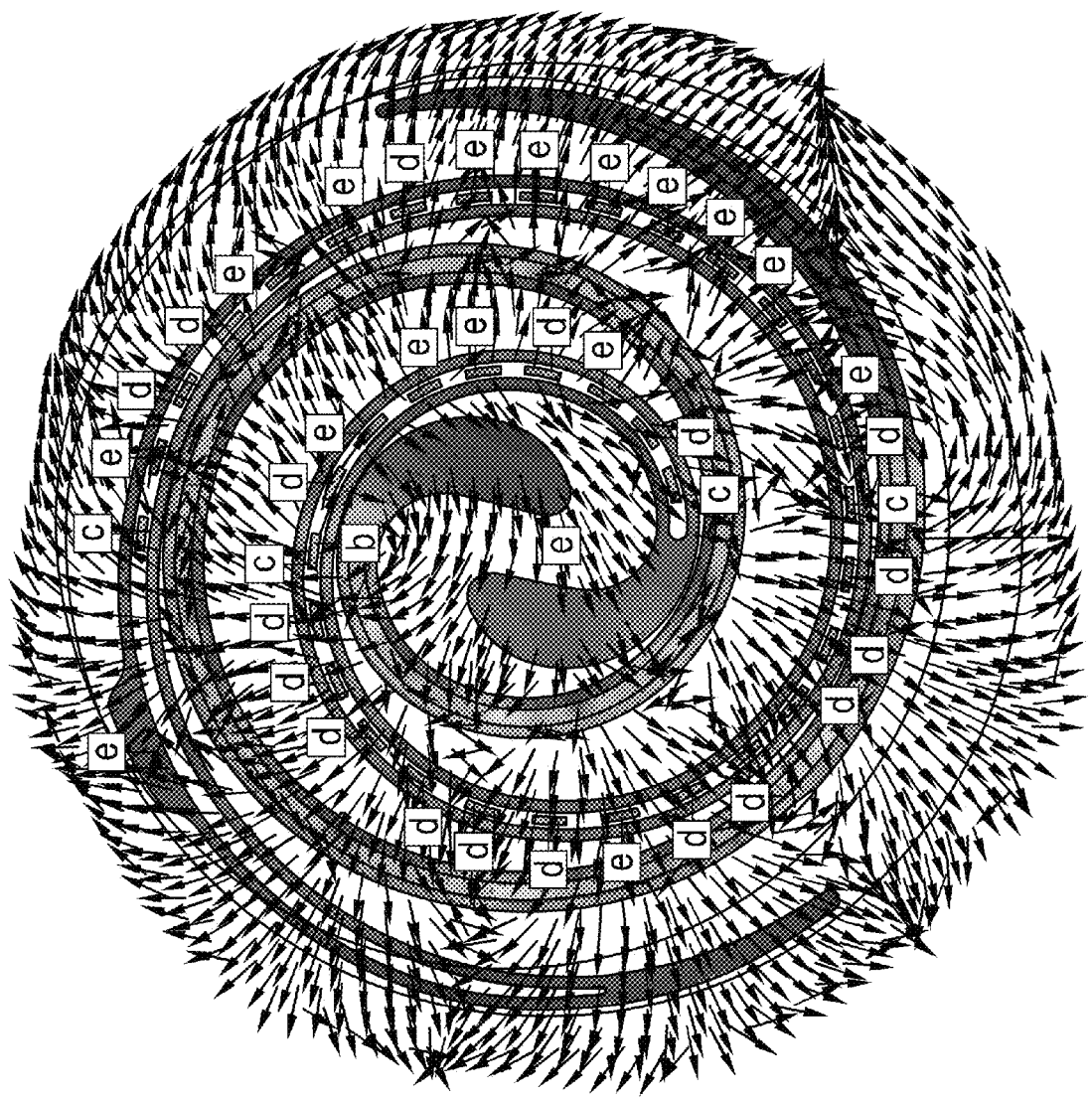
Figure 8D:
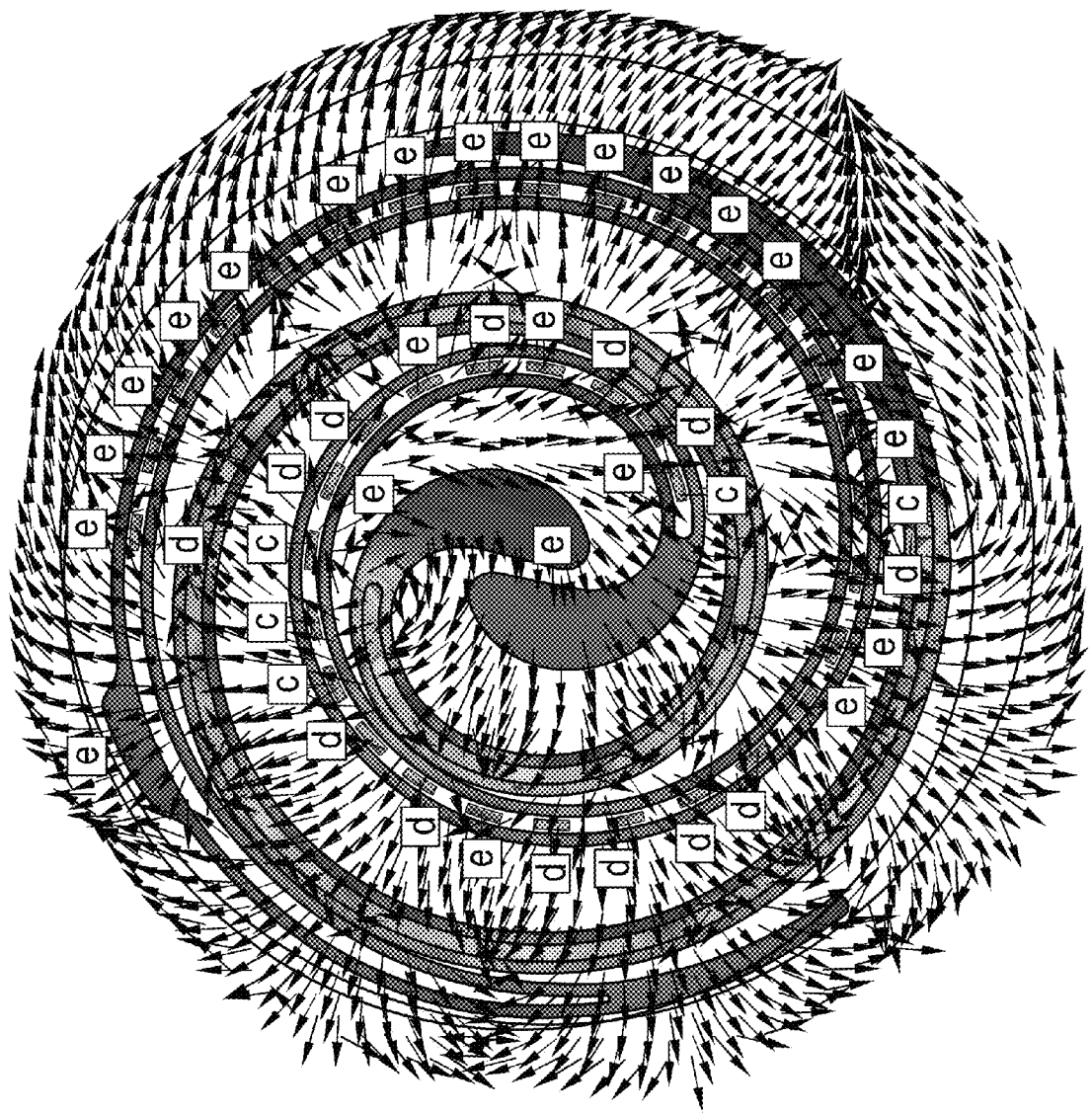

Referring to FIG. 6, a coil 22 which may be included in the fixed scroll 12a is shown.

The coil 22 includes a conducting wire 61 wrapped around a core 62.

The core 62 includes a cuboidal central part 62a and two cuboidal side plates 62b, 62c. The side plates 62b, 62c are attached to opposite faces of the central part 62a, forming a channel around the other four faces of the central part 62a.

The conducting wire 61 is wrapped around the central part 62a in the channel. In this example, there are four turns of conducting wire 61. However, there may be fewer or more turns. For example, there may be tens of turns. In some examples, instead of a conducting wire 61, the coil 22 may include a different type of elongate conductor, for example a conducting tape.

The central part 62a of the core 62 includes a 'soft' ferromagnetic material such as iron. In this way, the induced currents can be increased. In other examples, the central part 62a may be non-magnetic. The side plates 62b, 62c may be non-magnetic.

The coil 22 is located in the void 12c in the fixed scroll 12a and is aligned such that the coil axis 63 is substantially aligned with a radial line from the centre of the fixed scroll 12a. The coil 22 is substantially the same size as the void 12c in the direction parallel with the radial line (hereinafter referred to as the "width"). The coil 22 has a smaller size than the void 12c in the direction perpendicular to the second plane defined by the upper surface 12e of the fixed plate 12b (hereinafter referred to as the "height"). This is so that there is space for the washer 24 (FIG. 5b). In other examples, the coil 22 may have a different height and/or width.

In other examples, instead of a cuboid, the coil 22 may be a different shape, e.g. a cylindrical or elliptically cylindrical shape. The coil 22 need not include the side plates 62b, 62c. The coil 22 may be aligned differently, e.g. substantially aligned with the spiral defined by the fixed scroll 12a.

Lengths 61a, 61b at each end of the conducting wire 61 extend through the passage 12d in the fixed plate 12b. In other examples, separate wires may be connected to each end of the conducting wire 62, e.g. via connectors on the coil 22, and may extend through the passage 12d.

Referring to FIG. 7, an alternative coil 22' which may be used in the fixed scroll 12a is shown.

The alternative coil 22' includes two substantially parallel plates 71, 72 which are interconnected by a set of substantially parallel members in the form of enamelled wires 73. The plates 71, 72 and the wires 73 are formed from a conducting material such as copper. In this example, the plates 71, 72 are cuboidal and the wires 73 are cylindrical. However, they may be different shapes. In this example, there are twenty wires 73. However, there may be fewer or more wires 73.

The alternative coil 22' is located in the void 12c in the fixed scroll 12a and is aligned such that the members 73 are substantially perpendicular to the second plane defined by the upper surface 12e of the fixed plate 12b. In other examples, the members 73 may be aligned differently. For example, they may be substantially parallel to the second plane and to a radial line from the centre of the fixed scroll 12a. In this example, the alternative coil 22' has the same height and width as the coil 22 described above. However, the alternative coil 22' may have a different height and/or width.

Conducting wires 74, 75 are connected to each of the plates 71, 72 and extend through the passage 12d in the fixed plate 12b.

Referring to FIGS. 8a, 8b, 8c and 8d, the magnetic fields in an example of a scroll expander 10' are shown. The scroll expander 10' corresponds to the above described scroll expander 10 with a moving part corresponding to the above described alternative moving part 11' (see FIGS. 3a and 3b) and a fixed part corresponding to the above described fixed part 12 (see FIGS. 5a and 5b) with thirty-seven coils 22.

The scroll expander 10' is shown in the first, second, third and fourth positions of the moving part 11' (see FIGS. 8a, 8b, 8c and 8d respectively). In each position (i.e. in each of the first, second, third and fourth positions), the moving part of the scroll expander 10' has moved around its orbit by 90° in its rotation direction from the previous position (i.e. from the fourth, first, second and third positions respectively).

The arrows in the figures indicate the direction and distribution of the magnetic field and the shading indicates the magnitude of the magnetic flux density in the various elements of the scroll expander 10'. The labels 'a', 'b', 'c', 'd', and 'e' are used to identify certain levels of shading. The magnitude of the magnetic flux density in the moving part 11' is very similar in each of the figures and so this element is only labelled in FIG. 8*a*.

The magnitude of the magnetic flux density magnetic field in each of the coils 22 changes as the moving part 11' moves. Moreover, the changing magnetic field is largely aligned with the axes of the coils 22. Therefore, there is a changing magnetic flux in each of the coils 22 and hence voltages generated across each of the coils 22.

Referring to FIG. 9, certain aspects of the device 1 including the scroll expander 10 will now be described in more detail.

The device 1 includes one or two or more electrical outputs 91 which are electrically connected to the coils 22, 22'. The electrical outputs 91 are, in turn, electrically connectable to an external circuit 92.

The external circuit 92 may include any device which uses electrical power, e.g. lighting or a computing device. The external circuit 92 may include energy storage devices such as rechargeable batteries. The external circuit 92 may include a power distribution or transmission network and the associated inverter connection circuitry.

The device 1 includes circuitry 94 connected between the coils 22, 22' and the electrical outputs 91. The circuitry 94 is to convert the induced currents into a form which is suitable for the external circuit 92. In other examples, the circuitry 94 need not be included, for example if the induced currents are already in a suitable form or if the external circuit 92 includes its own conversion circuitry.

The induced currents in each of the coils 22, 22' generally have an alternating current (AC) waveform. The amplitude, shape, frequency and phase of the AC waveform will depend upon characteristics of the scroll expander 10 including, for example, the characteristics of the magnetic field provided by the moving scroll 11*a*, the characteristics of the coil 22, 22', the speed of movement of the moving part 11 and the position of the coil 22, 22' in the fixed scroll 12*a*.

The circuitry 94 may include one or more power converters. In some examples, a rectifier is connected to each of the coils 22, 22'. The rectifier is adapted to convert the induced currents to direct current (DC) currents. In some examples, the DC currents for each of the coils 22, 22' are then summed and provided to the output 91. In some examples, additional elements, e.g. smoothing circuitry, may be provided. The circuitry 94 may include an inverter to convert the DC currents to an AC current corresponding, for example, to mains electricity. The circuitry 94 may include a DC to DC converter to provide a DC electrical output, for example, at a predetermined voltage which is suitable for the external circuit 92.

In some examples, sets of two or more coils 22, 22' may be electrically connected to one another before being connected to the circuitry 94. All of the coils 22, 22' may be interconnected in this way. The electrical connections between coils 22, 22' may be in series or in parallel. The electrical connections may be made inside the fixed scroll 12*a* (as explained above) or elsewhere, e.g. on the lower surface 12*f* of the fixed plate 12*b*. In this way, the currents or voltages in the coils 22, 22' can be summed before being provided to the circuitry 94. A rectifier, or an inverter, for example, may be connected to each of the sets of two or more coils 22, 22'.

Referring still to FIG. 9, a system 90 including the device 1 will now be described.

In some examples, the system 90 is a system for generating electrical power from compressed air. In particular, in some examples, the system 90 is a compressed air energy storage system. In these examples, the inlet 15 of the scroll expander 10 is connected to a source 93 of compressed air. The source 93 may be, for example, a cylinder, tank or an underground cavern filled with compressed air. The source 93 may be pre-filled or the system 90 may include means (not shown) for filling the source 93 with the compressed air, e.g. a compressor. The system 90 may also include a valve (not shown) to start or stop flow of the compressed air to the inlet 15 and hence the operation of the scroll expander. The system 90 may also include a pressure regulator (not shown) to control the pressure of the compressed air and hence the speed of movement of the scroll expander 10 and the characteristics of the induced currents. The valve and pressure regulator may be electronically controlled. The outlet 16 of the scroll expander 10 may release the air into the atmosphere. The system 90 may include a lubricating oil service unit (not shown) to the scroll expander for reducing the air leakage and smoothing its movement.

In some examples, the system 90 is a micro combined heat and power system. In these examples, a working fluid such as an organic refrigerant may circulate in a closed loop in which fluid is returned from the output 16 to the input 15 of the scroll expander 10 via, for example, a condenser (not shown), a pump (not shown) and a boiler (not shown). Such a system 90 is also adapted to use waste heat to produce hot water.

Thus, the device 1 described above can be a simple, efficient and cost effective direct electric generator which can be used in various different applications.

It will be appreciated that many other modifications may be made to the embodiments hereinbefore described.

For example, the moving scroll 11*a* may include one or more field coils (or, in other words, electromagnets) to provide the magnetic field. The magnetic region 21 may be included on one or more surfaces of the moving scroll 11*a*. The moving scroll 11*a* itself may be formed from a suitable magnetic material.

One or more of the features which are described as being associated with the moving part 11 may be associated with the fixed part 12 and vice versa.

For instance, the magnetic region 21 may be included in the fixed part 12 and the coils 22 may be included in the moving part 11.

The moving part 11 and/or the fixed part 12 may include both magnetic regions 21 and coils 22. In some examples, magnetic regions in the two parts 11, 12 may be arranged to interact with each other to generate additional forces (torque) between the two parts 11, 12 at certain relative positions. This can reduce the air leakage, improve the energy efficiency of the scroll expander, and allow the scroll expander to work with a relatively low pressure fluid.

Magnetic regions 21 and/or coils 22 may be included in the moving and/or fixed plates 11*b*, 12*b*.

Both parts of the scroll expander 1 may move.

Instead of a scroll expander 10, the device 1 may include a scroll compressor. In this case, the device 1 may include means for driving the scroll compressor. In this case, the device 1 can be adapted to compress fluid, e.g. air, and at the same time generate electrical power.

The device 1 may include a scroll expander/compressor adapted to compress the fluid, e.g. air, in a first mode (for example, when excess electrical power is available) and to generate the electrical power in a second mode (for example, when electrical power is required).

The invention claimed is:

1. A device for generating electrical power, the device comprising:
    a scroll expander with first and second scrolls configured to move relative to each other when a fluid is provided to an inlet at a higher pressure than a pressure at an outlet,
    wherein the first scroll comprises one or more magnetic regions, wherein each magnetic region is configured to provide a magnetic field, and
    wherein the second scroll comprises one or more conductors in which electric currents are induced when the first and second scrolls move relative to each other.

2. A device according to claim 1, wherein the one or more magnetic regions extend around and/or are spaced around the first scroll.

3. A device according to claim 2, wherein at least one of the one or more magnetic regions is unidirectionally magnetised.

4. A device according to claim 3, wherein the first scroll has a centre and the at least one unidirectionally magnetised magnetic region is magnetised in a direction substantially parallel to a radial line extending from the centre of the first scroll through a centre of the at least one unidirectionally magnetised magnetic region.

5. A device according to claim 1, wherein the one or more conductors comprise a plurality of conductors distributed around and along a length of the second scroll.

6. A device according to claim 1, wherein the one or more magnetic regions comprise a plurality of magnetic regions and the one or more conductors comprise a plurality of conductors, and
    wherein one or more of the plurality of conductors is arranged in association with a corresponding one or more of the plurality of magnetic regions.

7. A device according to claim 1, wherein at least one of the one or more conductors comprises a coil.

8. A device according to claim 7, wherein the first scroll has a centre and a coil axis of the coil is substantially aligned with a radial line extending from the centre of the first scroll.

9. A device according to claim 1, wherein the first scroll has a centre and at least one of the one or more conductors comprises one or more conducting members connecting two conducting plates, wherein the conducting members extend in a direction substantially perpendicular to a radial line extending from the centre of the first scroll.

10. A device according to claim 1, wherein at least one of the one or more magnetic regions is included inside the first scroll.

11. A device according to claim 1, comprising circuitry electrically connected to the one or more conductors and configured to convert the induced currents to provide an electrical output with predetermined characteristics.

12. A device according to claim 1, wherein the second scroll comprises one or more magnetic regions, wherein each magnetic region of the second scroll is configured to provide a magnetic field.

13. A device according to claim 12, wherein the first scroll further comprises one or more conductors in which electric currents are induced when the first and second scrolls move relative to each other.

14. A system comprising a device according to claim 1, wherein the system is a micro combined heat and power system, a compressed air energy storage system, a back-up power system, a standby power system, or an Uninterruptible Power Supply (UPS) system.

15. A device according to claim 1, wherein at least one of the one or more conductors is included inside the second scroll.

16. A device according to claim 15, wherein the second scroll has an inside and a plate associated with the second scroll comprises one or more passages to the inside of the second scroll to allow electrical connections to be made to the at least one conductor included inside the second scroll.

17. A device comprising:
    a scroll compressor, the scroll compressor comprising first and second scrolls configured to move relative to each other to pump, compress or pressurize a fluid in response to a driving force applied to the first scroll and/or the second scroll,
    wherein the first scroll comprises one or more magnetic regions, wherein each magnetic region is configured to provide a magnetic field, and
    the second scroll comprises one or more conductors in which electric currents are induced when the first and second scrolls move relative to each other.

* * * * *